US012271755B2

(12) United States Patent
Lu et al.

(10) Patent No.: US 12,271,755 B2
(45) Date of Patent: Apr. 8, 2025

(54) SYSTEMS AND METHODS FOR JOB-LEVEL MEMORY GOVERNING

(71) Applicant: MicroStrategy Incorporated, Tysons Corner, VA (US)

(72) Inventors: Xianting Lu, Herndon, VA (US); Maria Villar Athie, Oakton, VA (US); Hao Xu, Ashburn, VA (US); Qi Yan, Sterling, VA (US); Siyi Jia, Fairfax, VA (US)

(73) Assignee: MicroStrategy Incorporated, Tysons Corner (VA)

(*) Notice: Subject to any disclaimer, the term of this patent is extended or adjusted under 35 U.S.C. 154(b) by 620 days.

(21) Appl. No.: 17/363,131

(22) Filed: Jun. 30, 2021

(65) Prior Publication Data

US 2022/0058057 A1     Feb. 24, 2022

Related U.S. Application Data

(60) Provisional application No. 63/067,387, filed on Aug. 19, 2020.

(51) Int. Cl.
    *G06F 8/20*     (2018.01)
    *G06F 9/50*     (2006.01)

(52) U.S. Cl.
    CPC ................. *G06F 9/5016* (2013.01)

(58) Field of Classification Search
    CPC ...................................... G06F 9/5016
    See application file for complete search history.

(56) References Cited

U.S. PATENT DOCUMENTS

| 2012/0179882 | A1* | 7/2012 | Bernhard, III | G06F 9/5022 |
| | | | | 711/171 |
| 2014/0109104 | A1* | 4/2014 | Majewski | G06F 9/50 |
| | | | | 718/104 |
| 2019/0235921 | A1* | 8/2019 | Kurian | G06F 9/5072 |
| 2020/0044983 | A1* | 2/2020 | Zheng | H04L 47/801 |

* cited by examiner

*Primary Examiner* — Kevin L Young
*Assistant Examiner* — Abdou K Seye
(74) *Attorney, Agent, or Firm* — Bookoff McAndrews, PLLC (57) ABSTRACT

Systems and methods are disclosed herein for governing memory allocation in response to job requests. In one embodiment, a job request may be received from a user, the job request specifying a data processing job to be completed. A memory usage limit and a quantity of memory needed for the data processing job may be determined. Upon determining that the quantity of memory needed for the data processing job exceeds the memory usage limit, instructions may be provided to cancel the data processing job. On the other hand, if the quantity of memory needed for the data processing job does not exceed the memory limit, execution of the data processing job may be allowed.

12 Claims, 6 Drawing Sheets

SYSTEMS AND METHODS FOR JOB-LEVEL MEMORY GOVERNING

CROSS-REFERENCE TO RELATED APPLICATION

This application claims benefit to U.S. Provisional Patent Application No. 63/067,387, filed Aug. 19, 2020, the entire contents of which are incorporated herein by reference.

TECHNICAL FIELD

Embodiments of the present disclosure relate generally to memory management in a computing environment. More particularly, some aspects of the present disclosure relate to governing memory allocation in response to job requests, based on memory usage restrictions assigned to user groups.

BACKGROUND

Memory management features of a computer's operating system play an important role in optimizing the performance of a memory by efficiently allocating memory space to multiple processes at the time of execution. For instance, memory allocation enables effective management of a memory by distributing ownership of limited memory resources among many ongoing processes. The primary goal of memory management is to satisfy requests made by processes, including requests made during execution of other processes, without degradation in performance.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

One embodiment provides a computer-implemented method for governing memory allocation, comprising: receiving a job request from a user, the job request specifying a data processing job to be completed; determining a memory usage limit for the data processing job based on the user; determining a quantity of memory needed for the data processing job; determining whether the quantity of memory needed for the data processing job exceeds the memory usage limit; and upon determining that the quantity of memory needed for the data processing job exceeds the memory usage limit, providing instructions to cancel the data processing job; or upon determining that the quantity of memory needed for the data processing job does not exceed the memory usage limit, allowing execution of the data processing job.

Another embodiment provides a system comprising one or more processors and one or more computer readable media storing instructions which, when executed by the one or more processors, cause the one or more processors to perform operations for governing memory allocation. The operations may comprise: receiving a job request from a user, the job request specifying a data processing job to be completed; determining a memory usage limit for the data processing job based on the user; determining a quantity of memory needed for the data processing job; determining whether the quantity of memory needed for the data processing job exceeds the memory usage limit; and upon determining that the quantity of memory needed for the data processing job exceeds the memory usage limit, providing instructions to cancel the data processing job; or upon determining that the quantity of memory needed for the data processing job does not exceed the memory usage limit, allowing execution of the data processing job.

Another embodiment provides one or more non-transitory computer readable media storing instructions which, when executed by one or more processors, cause the one or more processors to perform operations for governing memory allocation. The operations may comprise: receiving a job request from a user, the job request specifying a data processing job to be completed; determining a memory usage limit for the data processing job based on the user; determining a quantity of memory needed for the data processing job; determining whether the quantity of memory needed for the data processing job exceeds the memory usage limit; and upon determining that the quantity of memory needed for the data processing job exceeds the memory usage limit, providing instructions to cancel the data processing job; or upon determining that the quantity of memory needed for the data processing job does not exceed the memory usage limit, allowing execution of the data processing job.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

The following embodiments describe systems and methods for memory management in a computing environment and, more particularly, for governing memory allocation in response to data processing job requests, based on memory usage restrictions assigned to user groups. Data processing jobs may be performed for example, to generate data analytics, perform data wrangling, accumulate processed data into a dossier, graphs, report, or document, etc. Each data processing job may have child jobs or multiple jobs associated therewith, as will be discussed further herein.

With the advancement in distributed computing and network technology, memory management in servers or other computing devices that serve multiple users simultaneously at any given point in time poses additional challenges. For example, execution times of processes may directly depend upon the availability of data in the main memory, and users many experience delay or failure while trying to complete important tasks if memory resources are not effectively managed.

The present disclosure is directed to addressing one or more of these challenges. In one embodiment, a server may be configured to process a plurality of job requests received from users, and may allocate memory spaces to users in accordance with pre-configured memory usage restrictions. For instance, a job governing component implemented on the server may determine a memory usage limit for each requested job and a quantity of memory that would be required to execute the job, and may determine whether the quantity of memory required for the job exceeds the memory usage limit. If the memory usage limit is exceeded, instructions may be provided to cancel the job. If the memory usage limit is not exceeded, the job may be allowed to be executed. The memory usage limit for a job may be determined based on a user group structure, which comprises a plurality of user groups that the job-requesting user might be associated with and memory usage limit(s) assigned thereto.

The embodiments contemplated in the present disclosure provide means for applying memory usage limits to individual jobs on a user or user-group level. If a user's job request requires a memory space larger than that allotted by an applicable memory usage limit, the job is denied or canceled, essentially freeing up the memory space for other jobs being in compliance with pre-configured memory settings. This way, a user would be prevented from taking up a memory space larger than that allotted based on the role or user group associated with the user, lessening the load on memory resources which might be accessed by a plurality of users simultaneously at any given point in time.

The subject matter of the present disclosure will now be described with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Figure 1:
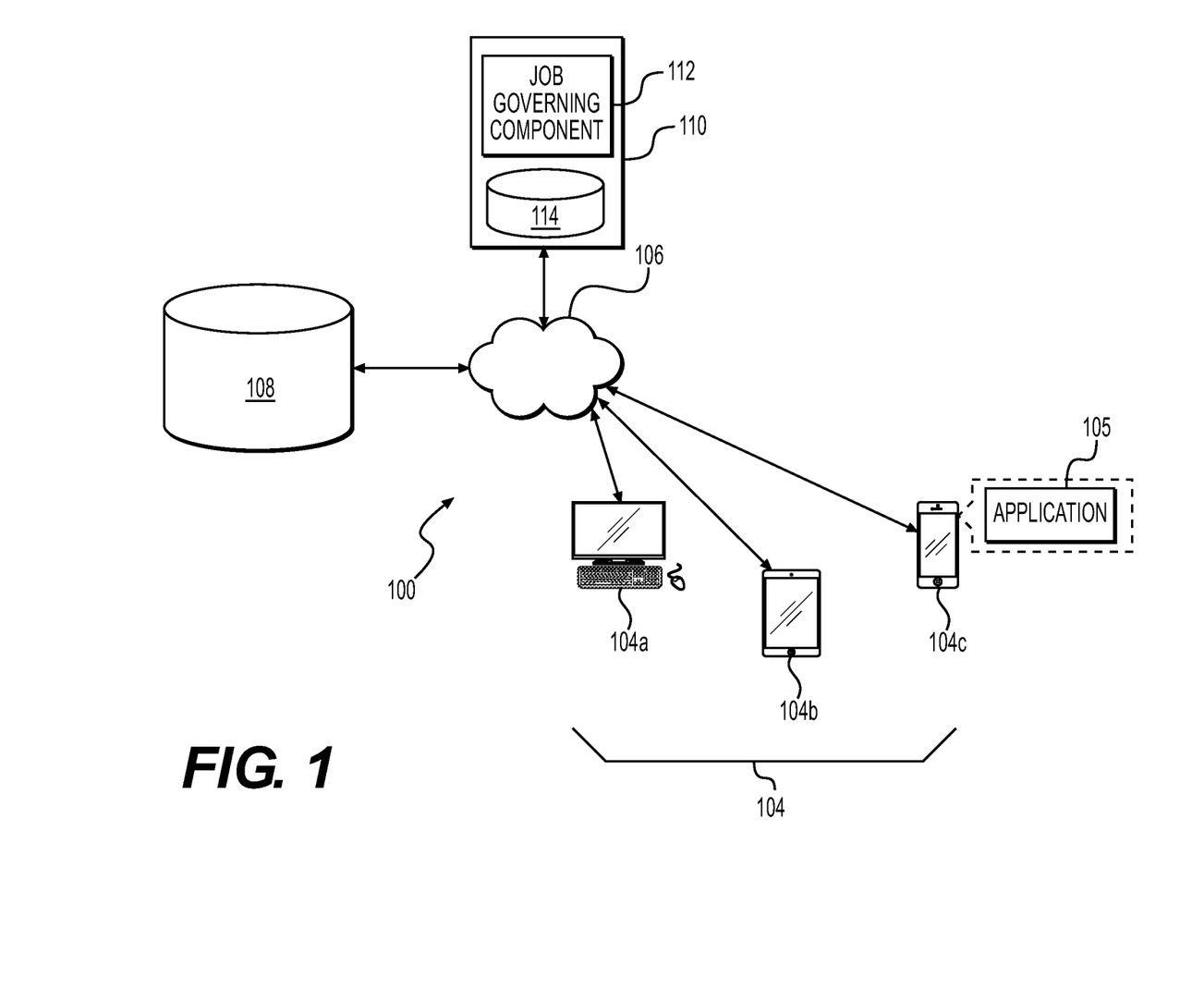
FIG. 1 is a diagram of an exemplary system capable of governing memory allocation in response to job requests, according to one aspect of the present disclosure.

Referring now to the appended drawings, FIG. 1 is a diagram of an exemplary system capable of governing memory allocation in response to job requests, according to one aspect of the present disclosure. In general, the system 100 may include user devices 104a, 104b, and 104c, a server 110, a database 108, and a network 106. In one embodiment, the server 110 may have access to the database 108 for an entity such as, for example, an organization or a company. In other embodiments, the server 110 may have access to the database 108 for an unrestricted set of users in communication with the server 110. The server 110 may be implemented using a single computer, or multiple computers that cooperate to perform the functions discussed below, which may be located in a single geographic location or remotely from one another. The server 110 may be implemented using one or more computing devices consistent with the one depicted in FIG. 6.

Various types of user devices (i.e., user devices 104a, 104b, and 104c) are shown in FIG. 1 to illustrate that a user device may be any type of computing device capable of performing the functions discussed below (i.e., a computing device consistent with the one depicted in FIG. 6). For the sake of brevity however, a user device of any form will be referred to as a user device 104. In one embodiment, the user device 104 may include an application 105 that enables the user device 104 to retrieve desired information or access certain application functions available from the server 110. For example, the application 105 may enable the user device 104 to design, configure, generate, and/or display information objects such as, e.g., documents, information cards, etc., in response to certain actions being performed on the user device. Particularly, upon a user action triggering the design, configuration, generation, and/or display of information objects, the application 105 may communicate with the server 110 to retrieve relevant information or data objects from the database 108, which may be in communication with the server 110. Alternatively or additionally, the desired information or data objects may be stored locally at the server 110, for example, in a local database or storage 114. The application 105 may interact with an operating system of the user device 104 and may use one or more application programming interfaces (APIs) to obtain desired information or data objects via the server 110. Prior to providing the retrieved information or data objects to the user device 104, the server 110 may perform data analytics on the information or data objects, transforming the information or data objects to a more user-friendly and intuitive format.

The user device 104 may be associated with a user. When the application 105 is executed on the user device 104, the user may be identified by the application 105. For example, the user may log in using one or more credentials and the application 105 may be able to determine a user identifier (ID) associated with the user based on the one or more credentials. Various aspects of the application 105 may be customized for the user upon logging in, including a graphical user interface (GUI) view of the application 105, GUI elements of the application 105, information and/or data objects retrievable by the application 105, functions of the application 105 authorized for use by the user, etc.

As an example, the user may be a member of an organization, e.g., an employee of a company. The database 108 may represent database records stored by or for the organization. The records may not be publicly available and may be subject to data access restrictions, such as requirements that users be issued credentials from the organization that grant authorization to access the records. Different users may be granted different levels of authorization, and the server 110 may enforce access restrictions so that each user may be only allowed to access the subsets of information the user is authorized to access. The access restrictions pertaining to users may be stored in the database 108 (and/or the local database or storage 114) as metadata. The access restrictions assigned to users may be generated, modified, and managed by an administrator via a user interface provided on a user device 104.

The server 110 may receive job requests from the user device 104 (e.g., from the application 105 or any application installed on the user device 104), which may or may not require retrieving information or data objects from the database 108. The server 110 may be a back-end server performing executions initiated by various job requests received from the user devices 104. As an example, in response to receiving a job request that requires data retrieval from the database 108 (or local database or storage 114), the server 110 may construct a query based on the job request defining actions associated with the job. The server 110 may then execute a query on the database 108 (e.g., runs a structured query language (SQL) against the database 108), perform analytical operations based on data retrieved from the database 108, and, based on the retrieved data and analytical operations, generate documents or other information objects which may be transferred to the user device 104 (e.g., the application 105) for presentation. Although not explicitly shown in FIG. 1, an intermediate server (e.g., an API gateway) may be situated between the server 110 and the user devices 104. Such an intermediate server may serve as a single entry for all request from users, and may proxy or route a received request to an appropriate service or server (e.g., to an appropriate API or server) or may "fan out" the received request to multiple services or servers. Prior to such routing, the request may be converted to a format consumable by the receiving service or server as necessary.

A job request received from a user device 104 might require a processor of the server 110 to reserve a memory space to perform a job specified in the request. A job may be a unit of work or a unit of execution performed by a processor. As a unit of execution, a job may be identified with a single process, or with a parent process which may in turn have sub-processes (i.e., child processes) corresponding to the tasks that constitute the job. In other words, a job may comprise i) a single execution or process, or ii) multiple executions or sub-processes/tasks. A job request may also include a user ID associated with the user making the request. As explained above, for example, the application 105 may generate a user ID based on user credentials submitted during a login process. The user ID in the job request may enable the server 110 or any software application implemented thereon (e.g., the job governing component 112) to identify the user that made the job request.

The job governing component 112 implemented on the server 110 may be a software application or a software module configured to receive an electronic job request and determine a quantity (i.e., an amount) of memory required for a job specified in the job request. To determine the required memory space, the job governing component 112 may monitor the quantity of memory requested by the job (i.e., process) to be executed. In one embodiment, the job governing component 112 may be configured to receive and/or monitor a request, message, or code generated for the job, which may indicate the quantity of memory required to execute the job. In the case of a job comprising a single execution, the job governing component 112 may be able to determine the required quantity of memory at once, as just one memory request may be made for a single execution. If a job comprises multiple executions or tasks, the job governing component 112 may need to iteratively determine the required memory spaces to calculate an aggregate quantity of memory, as multiple memory requests may be made in sequence.

Upon determining the quantity of memory required for a job, the job governing component 112 may determine whether the quantity of memory exceeds a memory usage limit for the job. To determine the memory usage limit applicable to the job, the job governing component 112 may identify the user that made the request based on a user ID included in the job request, identify one or more user groups in which the user belongs, analyze memory usage limits assigned to the user groups, and select a memory usage limit based on certain selection rules. In one embodiment, the memory usage limit determined for the user may be inserted into a user runtime that was created when the user logged in using the application 105. The selection rules may be pre-programmed by a developer of the job governing component 112 or pre-configured by an administrator of the job governing component 112. The manner in which a memory usage limit for a job is determined will be described in greater detail below.

It should be noted that, although the job governing component 112 may be implemented on the server 110 as illustrated in FIG. 1, the job governing component 12 can be implemented elsewhere such as, for example, at the user device 104 or at the database 108, and similarly execute the functionalities described in the present disclosure. In other words, the arrangement of devices and components illustrated in FIG. 1 is merely exemplary and may be modified in various ways while still enabling the functionalities of the job governing component 112.

Figure 2:
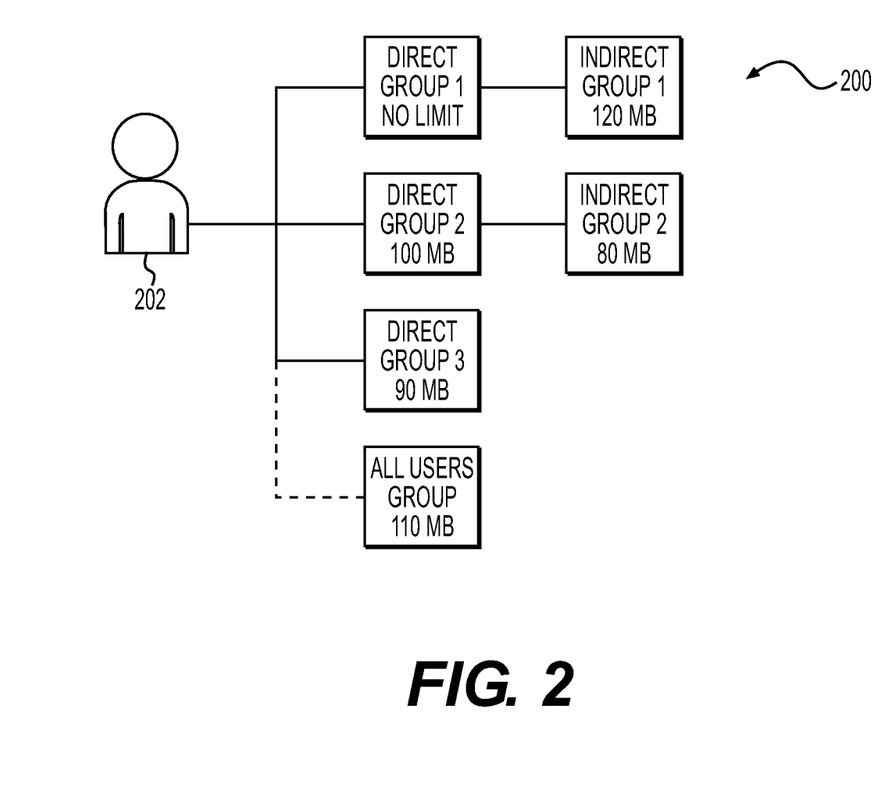
FIG. 2 illustrates an exemplary user group structure that may be associated with a user, according to one aspect of the present disclosure.

FIG. 2 illustrates an exemplary user group structure that may be associated with a user, according to one aspect of the present disclosure. As explained above, a user may belong in one or more user groups. Each user group may be or may not be assigned a memory usage limit. Based on the user group structure associated with a user and the memory usage limit(s) assigned to none, one, or multiple user groups in the user group structure, the job governing component 112 may allow or disallow the use of a memory space requested for a job. The user group structure and the memory usage limit(s) assigned to user groups may be stored in the database 108 (and/or the local database or storage 114) as metadata. The user group structure and the memory usage limit(s) assigned to user groups may be generated, modified, and managed by an administrator using a user interface provided on a user device 104. Via the user interface, the administrator may be able to access and send requests (e.g., read and write requests) to an API provided by the server 110 to create and modify the user group structure and memory usage limits. For instance, an administrator may be able to monitor a user's job requests and memory usage via a user activity dashboard, and may adjust the memory usage limit(s) assigned to user groups based on the memory usage information. The administrator may also be able to modify the user group structure (e.g., add or remove user groups, modify linkages between direct and indirect user groups, etc.).

In a user group structure, a user may be associated with one or more direct user groups, which may in turn be associated with respective indirect user groups. Therefore, a user group structure may comprise multiple levels of user groups (e.g., as shown in FIG. 2). Among the multiple levels of user groups, the user groups located in the level closest to the user may be called "direct" user groups. The user groups located in any other level may be called "indirect" user groups, with the level farthest from the user comprising the most indirect user groups. Each user group in the user group structure may or may not be assigned a memory usage limit. A user group structure may also include an "all users" group, which may serve as a default user group if a user is not associated with any direct or indirect user groups, or if direct and/or indirect user groups associated with a user are not assigned memory usage limits.

In one embodiment, a job requested by a user may be allowed a memory space equal to or less than a largest memory usage limit among direct user groups (i.e., one or more user groups located at a level that is most granular or closest to the user). In another embodiment, a job requested by a user may be allowed a memory space equal to or less than a smallest memory usage limit among direct user groups. In yet another embodiment, a job requested by a user may be allowed a memory space equal to or less than a largest memory usage limit among the most indirect user groups (i.e., one or more user groups located at a level that is farthest from the user). In yet another embodiment, a job requested by a user may be allowed a memory space equal to or less than a smallest memory usage limit among the mostmost indirect user groups. The manner in which a memory usage limit is determined for a job requested by a user may not be limited to the aforementioned examples, and may be configured in various ways based on user/administrator needs or preferences, system requirements, system status, organizational requirements, etc. Different ways of assigning a memory usage limit based on a user group structure may be defined in rules (i.e., selection rules). The job governing component 112 may use such selection rules in conjunction with the user group structure to determine a memory usage limit for a job requested by a user. In general, if a user is not associated with any user group, or if none of the user groups associated with the user is assigned a memory usage limit, the job requested by the user may be allowed a memory space equal to or less than a default memory usage limit (i.e., a memory usage limit assigned to the all users group).

As an example, in FIG. 2, a user 202 may be associated with a user group structure 200. In the user group structure 200, the user 202 may be associated with direct user groups (e.g., direct groups 1, 2, and 3), some of which may in turn be linked to respective indirect user groups (e.g., indirect groups 1 and 2). As shown in FIG. 2, some of these user groups may each be associated with a memory usage limit, while other user group(s) may not be associated with a memory usage limit (e.g., direct group 1). In one embodiment, once the server 110 receives a job request from a user 202 (via a user device 104 in FIG. 1), the job governing component 112 may identify the user group structure 200 based on a user identifier associated with the user 202 included in the job request, and may determine a memory usage limit for the requested job based on the user group structure 200. As explained above as one of many possible variations, the job governing component 112 may apply the largest memory usage limit among the direct user groups to the requested job. In other words, because the memory usage limit of 100 MB is the largest among the memory usage limits assigned to direct user groups (e.g., direct groups 1, 2, and 3), the memory usage limit of 100 MB may be applied to the job requested by the user 202. However, if the user 202 is not associated with any direct user groups or if none of the direct user groups is associated with a memory usage limit, the job governing component 112 may attempt to determine a memory usage limit from memory usage limits assigned to indirect user groups located in the adjacent level.

It should be noted that, although FIG. 2 shows only one level of indirect user groups, a user group structure may include additional levels of indirect user groups. In such a case, the job governing component 112 may analyze indirect user group levels sequentially starting from the level closest to the direct user group level, depending on whether a prior level failed to specify a memory usage limit applicable to the requested job.

A user group structure can be customized based on the characteristics of the organization or population the user group structure is designed to represent. Each user group may be assigned a designation that is representative of the users who belong in the user group. For example, a direct user group "computer engineers" created for an organization may include all computer engineers of that organization. An indirect user group "engineering department" created for the same organization may include all engineers, and may encompass and be linked with the "computer engineers" group. Also, the "engineering department" group may encompass and be linked with other direct groups, such as "electrical engineers," "data science engineers," "mechanical engineers," etc. The user group structure created for the organization may include other indirect user groups and corresponding direct user groups. For example, an indirect user group "HR department" may encompass and be linked with indirect groups "job analysts," "recruiters," "compensation and benefits managers," "labor relations managers," etc.

Figure 3:
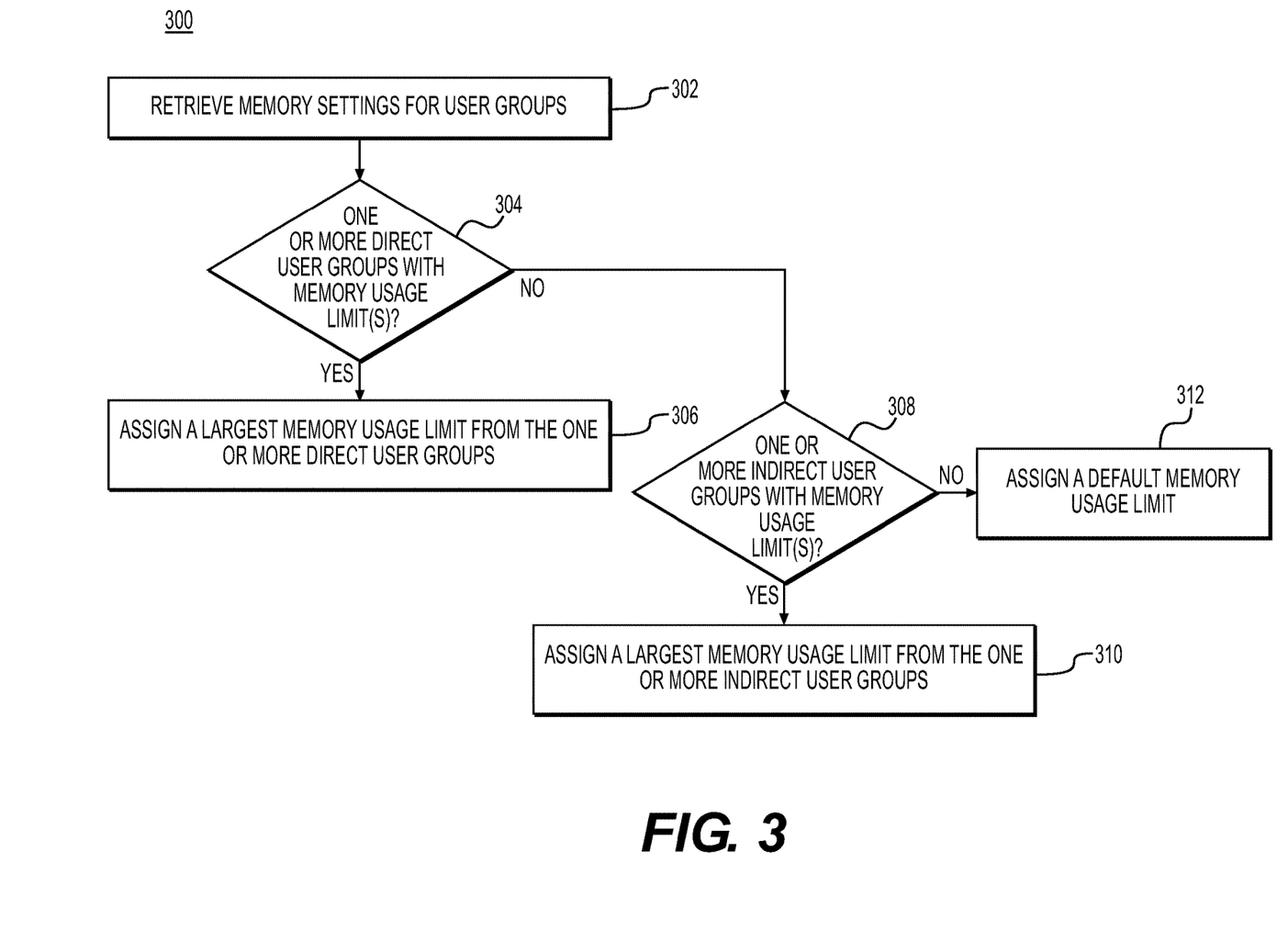
FIG. 3 is a flowchart illustrating an exemplary method of determining a memory usage limit for a job requested by a user, according to one aspect of the present disclosure.

FIG. 3 is a flowchart illustrating an exemplary method of determining a memory usage limit for a job requested by a user, according to one aspect of the present disclosure. Method 300 may be performed by the job governing component 112 upon receiving a job request from a user (i.e., a user device 104). At step 302, the job governing component 112 may retrieve memory settings for user groups, which may be stored in a database 108, or a local database or storage 114. The memory settings for user groups may comprise a user group structure. As explained above, a user group structure may include direct and/or indirect user groups associated with a user that are organized in multiple levels of granularity. Each user group may or may not be assigned a memory usage limit. At step 304, the job governing component 112 may determine whether one or more direct user groups that are assigned corresponding memory usage limit(s) exist in the memory settings (e.g., in the user group structure). If it is determined that one or more direct users groups with corresponding memory usage limit(s) exist, the method 300 may proceed to step 306 where a largest memory usage limit from the one or more direct user groups is assigned to the job requested by the user.

On the other hand, if it is determined that one or more direct user groups with corresponding memory usage limit(s) do not exist, the method 300 may proceed to step 308. At step 308, the job governing component 112 may determine whether one more indirect user groups that are assigned corresponding memory usage limit(s) exist in the memory settings (e.g., in the user group structure). If it is determined that one or more indirect user groups with corresponding memory usage limit(s) exist, the method 300 may proceed to step 310 where a largest memory usage limit from the one or more indirect user groups is assigned to the job requested by the user. On the other hand, if it is determined that one or more indirect user groups with corresponding memory usage limit(s) do not exist, the method 300 may proceed to step 312. At step 312, the job governing component 112 may assign a default memory usage limit (i.e., a memory usage limit assigned to the all users group) to the job requested by the user.

It should be noted that the method 300 assumes only one level of indirect user groups existing in the user group structure. However, as explained above in reference to FIG. 2, a user group structure may include additional levels of indirect user groups. In such a case, the job governing component 112 may analyze indirect user group levels sequentially starting from the level closest to the direct user group level, depending on whether a prior level failed to specify a memory usage limit applicable to the requested job. In other words, if an applicable memory usage limit can be identified at a particular indirect user group level, that memory usage limit may be assigned to the requested job without analyzing the remaining indirect user group level(s). If an applicable memory usage limit cannot be identified at a particular indirect user group level however, the job governing component 112 may move on to the next indirect user group level (i.e., a remaining indirect user group level adjacent to the level that was last analyzed) to identify a memory usage limit applicable to the requested job. If all of indirect user group levels have been analyzed and no applicable memory usage limit has been found, the job governing component 112 may assign a default memory usage limit (i.e., a memory usage limit assigned to the all users group) to the job requested by the user.

Figure 4:
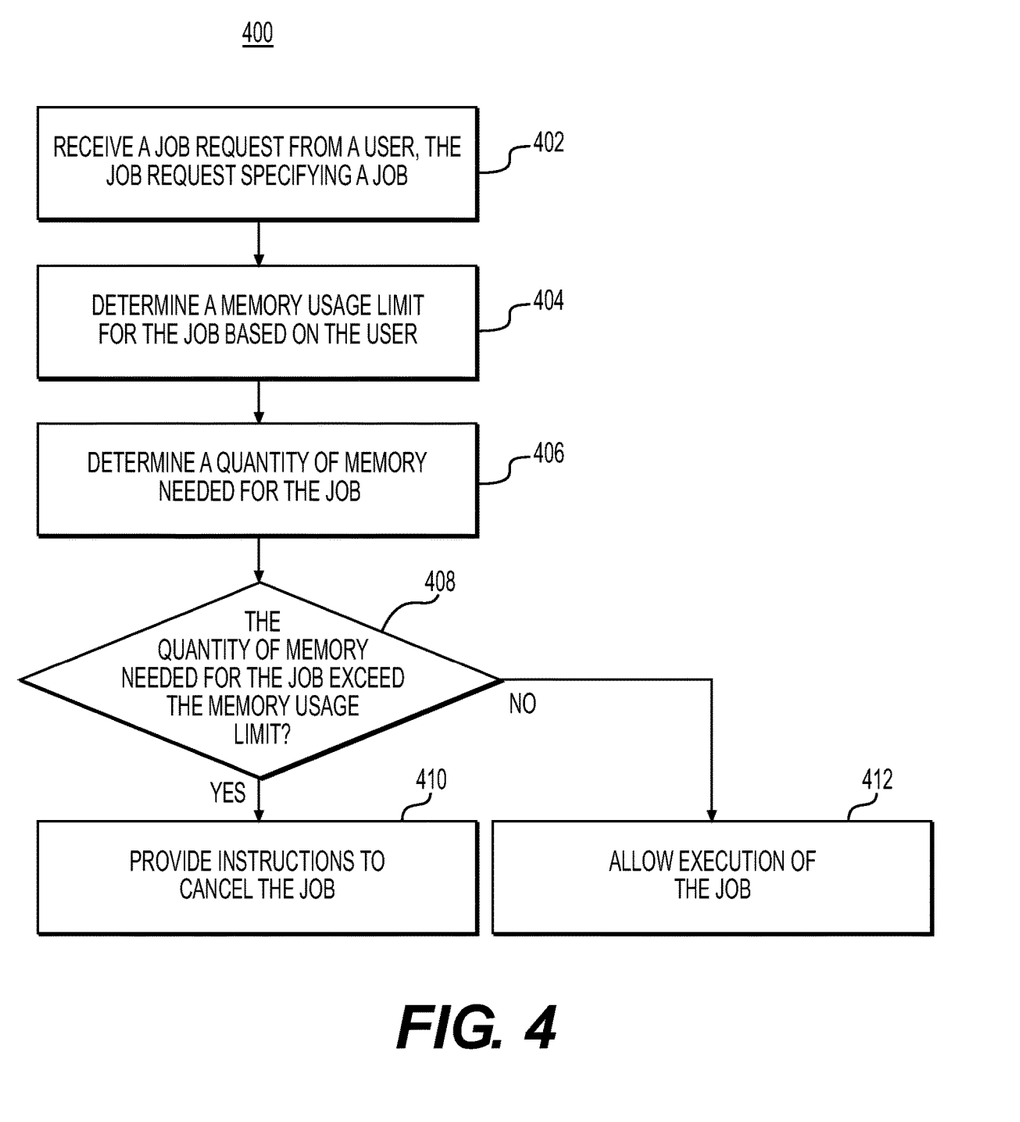
FIG. 4 is a flowchart illustrating an exemplary method of governing memory allocation in response to a job request, according to one aspect of the present disclosure.

FIG. 4 is a flowchart illustrating an exemplary method of governing memory allocation in response to a job request, according to one aspect of the present disclosure. Method 400 may be performed by the job governing component 112. Notably, the method 400 may be performed by the job governing component 112 if a job specified in a job request comprises a single execution. At step 402, the job governing component 112 may receive a job request from a user. As explained above, a job request may be submitted to the server 110 comprising the job governing component 112 when a user performs certain actions using a user device 104, or more particularly, using an application 105 installed on the user device 104. A user action may require retrieval of certain information or data objects from the database 108 or the local database or storage 114. The user action may further require analytical operations on the retrieved information or data objects. Therefore, a job request may specify a job to be performed by the server 110. A job request may also include a user identifier associated with the user who initiated the job request. At step 404, the job governing component 112 may determine a memory usage limit for the job based on the user. The techniques for determining a memory usage limit for a job, in view of a user who requests the job, were explained above in reference to FIG. 3.

At step 406, the job governing component 112 may determine a quantity of memory needed for the job (i.e., a requested memory space). A quantity of memory needed for the job may be determined by monitoring the quantity of memory requested by the corresponding process. Therefore, the job governing component 112 may be configured to monitor requests for memory spaces. To that end, the job governing component 112 may operate in conjunction with a memory manger implemented on the server 110. However, in other embodiments, the job governing component 112 may monitor memory requests independently, without operating in conjunction with the memory manager.

Once the memory usage limit for the job and the quantity of memory needed for the job have been determined, at step 408, the job governing component 112 may determine whether the quantity of memory needed for the job exceeds the memory usage limit for the job. If it is determined that the quantity of memory needed for the job exceeds the memory usage limit for the job, at step 410, the job governing component 112 may provide instructions to the processor to cancel the job. In addition, the job governing component 112 may return an error message to the user, indicating that the job requires a memory space larger than a memory usage limit for the job. In response, the user may be able to send a request to an administrator for a larger memory usage limit. On the other hand, if it is determined that the quantity of memory needed for the job does not exceed the memory usage limit for the job, at step 412, the job governing component 112 may allow execution of the job by the processor. Allowing execution of the job by the processor may involve providing instructions to the processor to complete the job, or merely letting the processor execute the job without sending any instructions.

Although not explicitly shown in FIG. 4, the job governing component 112 may log the memory usage limit and the requested memory space determined for each job, the user that requested the job, the type of job requested, when the job is requested, whether the job is canceled or not, and the reason for canceling or allowing execution of the job (i.e., whether the memory usage limit was exceeded by the requested memory space). The logged information may be stored in the database 108 and/or the local database or storage 114 as metadata, in association with a job identifier created for each job request and/or a user identifier. The logged information may be used by the server 110 to allow an administrator to better manage memory allocation. For example, the logged information may be displayed via user activity dashboard accessible by an administrator, enabling the administrator to review various information pertinent to memory usage and to adjust memory settings (e.g., the user group structure and memory usage limits specified therein). For example, the dashboard may allow the administrator to select a particular user from a plurality of users, and view the selected user's job and memory usage activities that have been monitored and logged. In some embodiments, the user activity dashboard may also be available to users without administrator privileges (i.e., regular users). However, a regular user may not be allowed to modify memory settings and/or view information related to certain other user(s).

In one embodiment, in a user activity dashboard, various information pertinent to a user's memory usage may be displayed for each job type (e.g., report creation, document creation, data visualization, etc.) requested by the user. For example, the number of job requests made as well as the average execution time for executed jobs may be displayed for each job type. Further, the average error rate or average cancelation rate for each job type (i.e., the likelihood of a job type being canceled due to a memory usage limit) may be displayed. In another embodiment, various information pertinent to a user's memory usage may be displayed for each individual job requested by the user. The information displayed for various job types or individual jobs may be ranked or ordered based on relevant parameters such as, e.g., a number of executions, an average execution time, an error rate, etc.

In viewing the information on the user activity dashboard, the administrator may be able to a set a time period to only display information that correspond to the set time period. The information may also be plotted in a chart or a graph, providing a better view for the administrator to identify a trend or pattern. Based on the displayed information, the administrator may be able to gauge how often the user executes a particular job type, how often the job type gets canceled due to memory constraints, etc. and may adjust memory settings to assign more appropriate memory constraints to the user and improve the user's experience.

Figure 5:
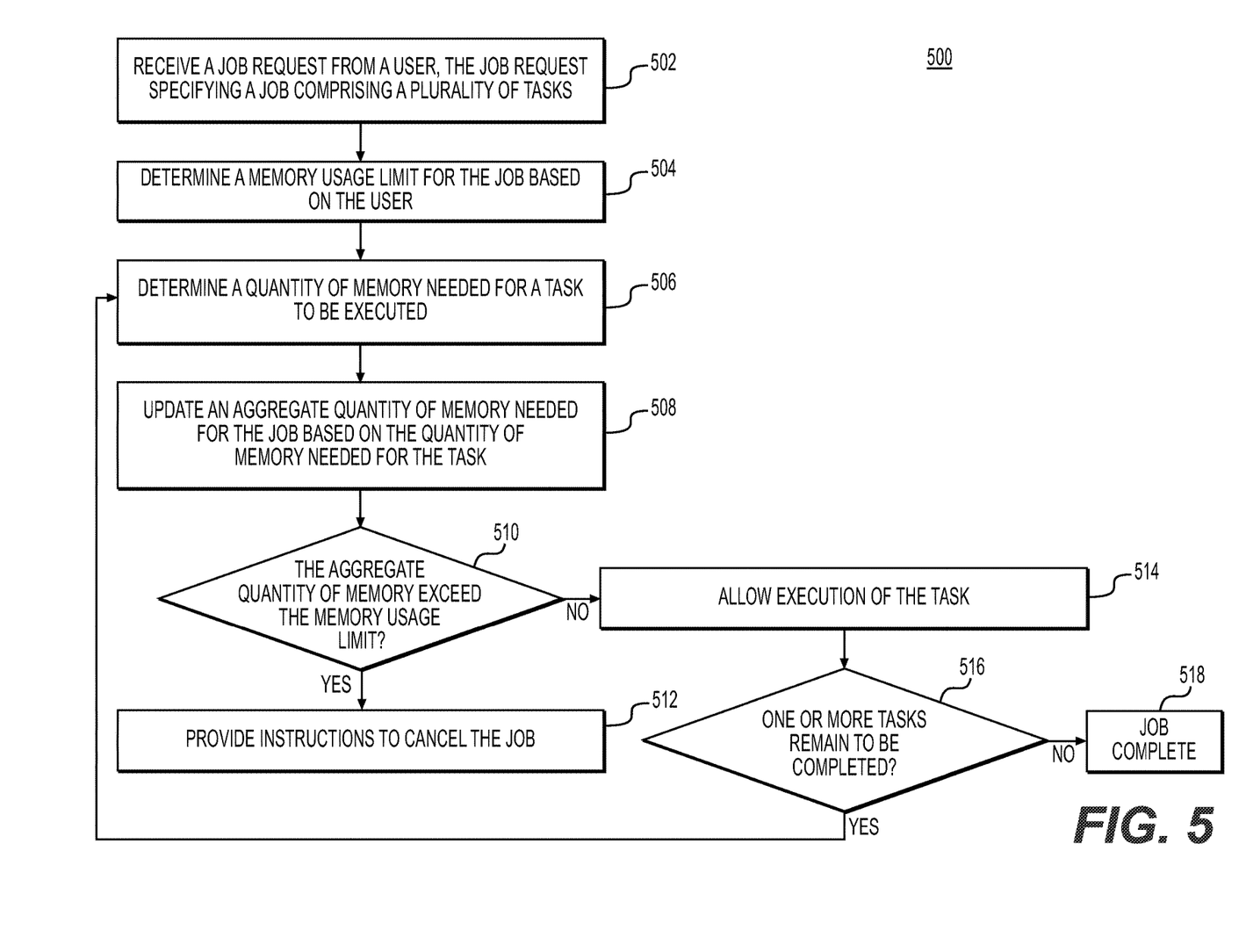
FIG. 5 is a flowchart illustrating another exemplary method of governing memory allocation in response to a job request, according to one aspect of the present disclosure.

FIG. 5 is a flowchart illustrating another exemplary method of governing memory allocation in response to a job request, according to one aspect of the present disclosure. Notably, method 500 may be performed by the job governing component 112 if a job specified in a job request comprises a plurality of tasks or executions. In one embodiment, the plurality of tasks or executions that constitute a job may comprise a parent task and one or more child tasks. A parent task may be initialized first based on the job request, and the parent task may spawn one or more child tasks to finish the overall job. For example, if a job concerns report creation requiring multiple reports, a parent task may be created when the report creation is initiated/requested, and multiple child tasks may be spawned by the parent task to generate the respective reports. In general, the parent task may be considered completed only after all the child tasks are completed.

In cases where the plurality of tasks of a job comprise a parent task and one or more child tasks, each of the parent and child tasks can be considered as a single standalone job, or the child tasks can be considered as dependencies of their parent task. In the former case where each of the parent and child tasks is considered as a single standalone job, the memory usage limit applicable to the job (e.g., 10 MB) may be applied separately to each of the parent and child tasks, meaning the quantity of memory needed for each parent or child task may be compared with the memory usage limit separately in order to determine whether or not to allow execution of each task. This type of scenario can be handled using the method 400 discussed above in reference to FIG. 4. In the latter case however where the child tasks are considered as dependencies of the parent task, the total quantity of memory needed for the parent task and the one or more child tasks (i.e., an aggregate quantity of memory needed for the job) may be determined and compared with the memory usage limit. This latter scenario can be handled using the method 500 illustrated in FIG. 5.

At step 502, the job governing component 112 may receive a job request from a user. As explained above, a job request may specify a job comprising a plurality of tasks (i.e., a plurality of executions or sub-processes) such as, e.g., a parent task and one or more child tasks spawned from the parent task. A job request may also include a user identifier associated with the user who initiated the job request. At step 504, the job governing component 112 may determine a memory usage limit for the job based on the user. The techniques for determining a memory usage limit for a job were explained above in reference to FIG. 3.

At step 506, the job governing component 112 may determine a quantity of memory needed for a task (i.e., a requested memory space) among the plurality of tasks. A quantity of memory needed for the task may be determined by monitoring the quantity of memory requested by the corresponding sub-process. Therefore, the job governing component 112 may be configured to monitor requests for memory spaces. To that end, the job governing component 112 may operate in conjunction with a memory manger implemented on the server 110. However, in other embodiments, the job governing component 112 may monitor memory requests independently, without operating in conjunction with the memory manager. At step 508, the job governing component 112 may determine an aggregate quantity of memory needed for the job based on the quantity of memory needed for the task. As will be explained later, the aggregate quantity of memory needed for the job may be updated every time a quantity of memory needed for a next task is determined.

Once the aggregate quantity of memory needed for the job has been determined, at step 510, the job governing component 112 may determine whether the aggregate quantity of memory exceeds the memory usage limit for the job. If it is determined that the aggregate quantity of memory needed for the job exceeds the memory usage limit for the job, at step 512, the job governing component 112 may provide instructions to the processor to cancel the job. In addition, the job governing component 112 may return an error message to the user, indicating that the job requires a memory space larger than a memory usage limit for the job. In response, the user may be able to send a request to an administrator for a larger memory usage limit.

On the other hand, if it is determined that the aggregate quantity of memory needed for the job does not exceed the memory usage limit for the job, at step 514, the job governing component 112 may allow execution of the task by the processor. Allowing execution of the task by the processor may involve providing instructions to the processor to complete the task, or merely letting the processor execute the task without sending any instructions.

Upon the task being executed by the processor, at step 516, the job governing component 112 may determine whether there are any remaining tasks to be executed. If so, the method may loop back to step 506, where the job governing component 112 may determine a quantity of memory needed for a next task to be executed by the processor. At step 508, the job governing component 112 may update the aggregate quantity of memory needed for the job based on the quantity of memory needed for the next task. Specifically, the job governing component 112 may determine the sum of all the quantities of memory determined for the previously-executed task(s) and the next task. At step 510, the job governing component 112 may determine whether the aggregate quantity of memory exceeds the memory usage limit for the job. If it is determined that the aggregate quantity of memory needed for the job exceeds the memory usage limit for the job, at step 512, the job governing component 112 may provide instructions to the processor to cancel the job. On the other hand, if it is determined that the aggregate quantity of memory needed for the job does not exceed the memory usage limit for the job, at step 514, the job governing component 112 may allow execution of the task by the processor. At step 516, the job governing component 112 may determine whether there are any remaining tasks to be executed. If so, the job governing component 112 may again perform the memory allocation governing functions of steps 506 through 512 or 514. If no additional task remains, the method 400 may proceed to step 518 where the job governing component 112 determines that the job has been completed.

In summary, in the case of a job comprising multiple tasks, the decision as to whether an ongoing job should be canceled may be made incrementally by the job governing component 112. In other words, when a job comprises a plurality of tasks, the job governing component 112 may iteratively perform steps 506, 508, 510, and 514, until the aggregate quantity of memory needed for the job exceeds the memory usage limit for the job, or until all of the tasks in the job are executed.

As explained above, the job governing component 112 may log the memory usage limit and the requested memory space determined for each job, the user that requested the job, the type of job requested, when the job is requested, whether the job is canceled or not, and the reason for canceling or allowing execution of the job (i.e., whether the memory usage limit was exceeded by the requested memory space). The logged information may be stored in the database 108 and/or the local database or storage 114 as metadata, and may be displayed via a user activity dashboard accessible by an administrator.

Unless specifically stated otherwise, as apparent from the following discussions, it is appreciated that throughout the specification discussions utilizing terms such as "processing," "computing," "calculating," "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

Figure 6:
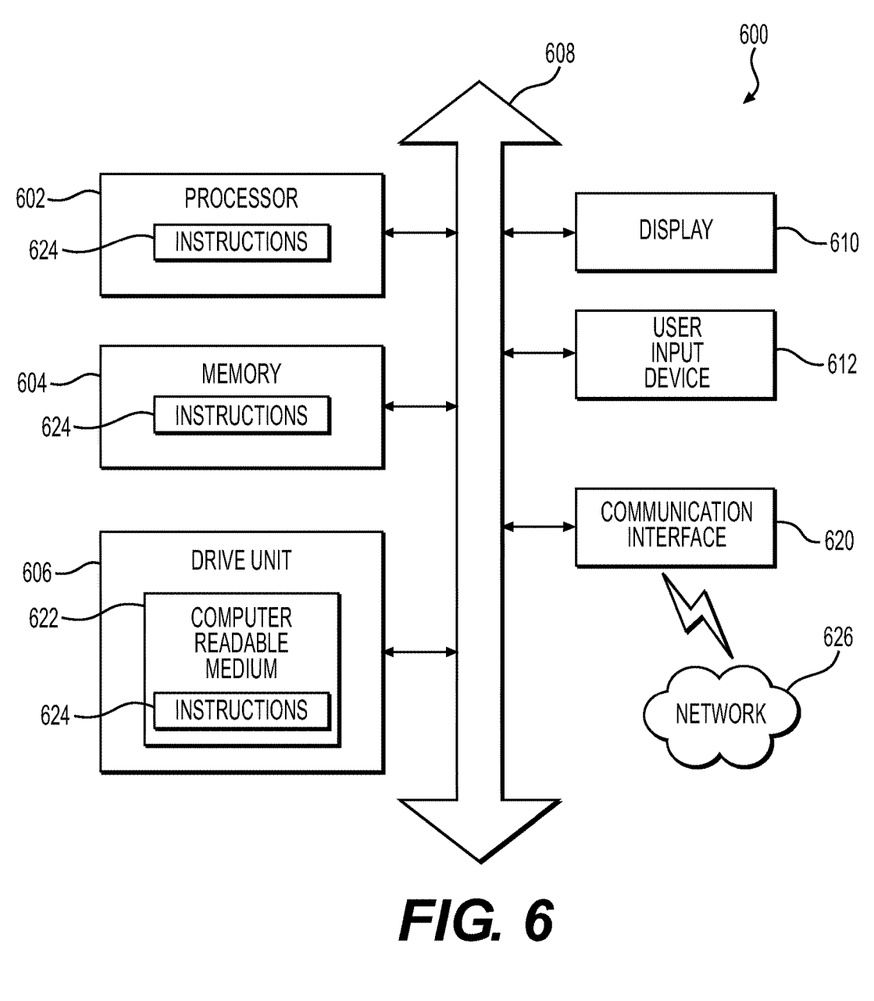
FIG. 6 illustrates an implementation of a computer system that may perform the techniques discussed in the present disclosure.

FIG. 6 illustrates an implementation of a computer system designated 600. The computer system 600 can include a set of instructions that can be executed to cause the computer system 600 to perform any one or more of the methods or computer based functions disclosed herein. The computer system 600 may operate as a standalone device or may be connected, e.g., using a network, to other computer systems or peripheral devices.

In a networked deployment, the computer system 600 may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 600 can be implemented using electronic devices that provide voice, video, or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. The processor 602 may be a component in a variety of systems. For example, the processor 602 may be part of a standard personal computer or a workstation. The processor 602 may be one or more general processors, digital signal processors, application specific integrated circuits, field programmable gate arrays, servers, networks, digital circuits, analog circuits, combinations thereof, or other now known or later developed devices for analyzing and processing data. The processor 602 may implement a software program, such as code generated manually (i.e., programmed).

The computer system 600 may include a memory 604 that can communicate via a bus 608. The memory 604 may be a main memory, a static memory, or a dynamic memory. The memory 604 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 604 includes a cache or random-access memory for the processor 602. In alternative implementations, the memory 604 is separate from the processor 602, such as a cache memory of a processor, the system memory, or other memory. The memory 604 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 604 is operable to store instructions executable by the processor 602. The functions, acts or tasks illustrated in the figures or described herein may be performed by the programmed processor 602 executing the instructions stored in the memory 604. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 600 may further include a display 610, such as a liquid crystal display (LCD), an organic light emitting diode (OLED), a flat panel display, a solid-state display, a cathode ray tube (CRT), a projector, a printer or other now known or later developed display device for outputting determined information. The display 610 may act as an interface for the user to see the functioning of the processor 602, or specifically as an interface with the software stored in the memory 604 or in the drive unit 606.

Additionally or alternatively, the computer system 600 may include an input device 612 configured to allow a user to interact with any of the components of system 600. The input device 612 may be a number pad, a keyboard, or a cursor control device, such as a mouse, or a joystick, touch screen display, remote control, or any other device operative to interact with the computer system 600.

The computer system 600 may also or alternatively include a disk or optical drive unit 606. The disk drive unit 606 may include a computer-readable medium 622 in which one or more sets of instructions 624, e.g. software, can be embedded. Further, the instructions 624 may embody one or more of the methods or logic as described herein. The instructions 624 may reside completely or partially within the memory 604 and/or within the processor 602 during execution by the computer system 600. The memory 604 and the processor 602 also may include computer-readable media as discussed above.

In some systems, a computer-readable medium 622 includes instructions 624 or receives and executes instructions 624 responsive to a propagated signal so that a device connected to a network 626 can communicate voice, video, audio, images, or any other data over the network 626. Further, the instructions 624 may be transmitted or received over the network 626 via a communication port or interface 620, and/or using a bus 608. The communication port or interface 620 may be a part of the processor 602 or may be a separate component. The communication port 620 may be created in software or may be a physical connection in hardware. The communication port 620 may be configured to connect with a network 626, external media, the display 610, or any other components in computer system 600, or combinations thereof. The connection with the network 626 may be a physical connection, such as a wired Ethernet connection or may be established wirelessly as discussed below. Likewise, the additional connections with other components of the computer system 600 may be physical connections or may be established wirelessly. The network 626 may alternatively be directly connected to the bus 608.

While the computer-readable medium 622 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 622 may be non-transitory, and may be tangible.

The computer-readable medium 622 can include a solid-state memory such as a memory card or other package that houses one or more non-volatile read-only memories. The computer-readable medium 622 can be a random-access memory or other volatile re-writable memory. Additionally or alternatively, the computer-readable medium 622 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 600 may be connected to one or more networks 626 (e.g., a network 106 in FIG. 1). The network 626 may define one or more networks including wired or wireless networks. The wireless network may be a cellular telephone network, an 802.11, 802.16, 802.20, or WiMax network. Further, such networks may include a public network, such as the Internet, a private network, such as an intranet, or combinations thereof, and may utilize a variety of networking protocols now available or later developed including, but not limited to TCP/IP based networking protocols. The network 626 may include wide area networks (WAN), such as the Internet, local area networks (LAN), campus area networks, metropolitan area networks, a direct connection such as through a Universal Serial Bus (USB) port, or any other networks that may allow for data communication. The network 626 may be configured to couple one computing device to another computing device to enable communication of data between the devices. The network 626 may generally be enabled to employ any form of machine-readable media for communicating information from one device to another. The network 626 may include communication methods by which information may travel between computing devices. The network 626 may be divided into sub-networks. The sub-networks may allow access to all of the other components connected thereto or the sub-networks may restrict access between the components. The network 626 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosed embodiments are not limited to any particular implementation or programming technique and that the disclosed embodiments may be implemented using any appropriate techniques for implementing the functionality described herein. The disclosed embodiments are not limited to any particular programming language or operating system.

It should be appreciated that in the above description of exemplary embodiments, various features of the present disclosure are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed embodiment requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment.

Furthermore, while some embodiments described herein include some but not other features included in other embodiments, combinations of features of different embodiments are meant to be within the scope of the present disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the disclosed techniques.

In the description provided herein, numerous specific details are set forth. However, it is understood that embodiments of the present disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments, those skilled in the art will recognize that other and further modifications may be made thereto without departing from the spirit of the present disclosure, and it is intended to claim all such changes and modifications as falling within the scope of the present disclosure. For example, any formulas given above are merely representative of procedures that may be used. Functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for governing memory allocation, the method comprising:
    receiving a job request from a user, the job request specifying a data processing job to be completed;
    retrieving memory settings for a plurality of user groups associated with the user;
    determining a plurality of memory usage limits assigned to a plurality of direct user groups among the plurality of user groups, each direct user group being directly associated with the user;
    determining a plurality of memory usage limits assigned to a plurality of indirect user groups among the plurality of user groups, each indirect user group being associated with one or more direct user groups and not directly associated with the user;
    determining a memory usage limit for the data processing job as:
        a largest memory usage limit assigned to a direct user group among the plurality of user groups upon determining that at least one direct user group among the plurality of direct user groups is assigned a memory usage limit, or
        the largest memory usage limit assigned to an indirect user group among the plurality of indirect user groups upon determining that no direct user group among the plurality of direct user groups is assigned a memory usage limit, or
        a default memory usage limit upon determining that no user group among the plurality of user groups is assigned a memory usage limit;
    automatically monitoring a plurality of executions of the data processing job;
    calculating a quantity of memory needed for each of the plurality of executions of the data processing job by automatically analyzing computer readable code generated for the job;
    determining an aggregate quantity of memory needed for the data processing job based on the monitoring;
    determining whether the quantity of memory needed for the data processing job exceeds the memory usage limit; and
    upon determining that the quantity of memory needed for the data processing job exceeds the memory usage limit, providing instructions to cancel the data processing job; or
    upon determining that the quantity of memory needed for the data processing job does not exceed the memory usage limit, allowing execution of the data processing job.

2. The computer-implemented method of claim 1, wherein the memory usage limit for the data processing job is determined based on a memory usage limit assigned to a user group associated with the user.

3. The computer-implemented method of claim 1, wherein the memory usage limit is pre-configured by an administrator.

4. The computer-implemented method of claim 1, wherein determining that at least one direct user group that is assigned a memory usage limit exists among the plurality of user groups comprises:
   determining a plurality of direct user groups that are assigned a plurality of memory usage limits respectively; and
   determining a largest memory usage limit among the plurality of memory usage limits assigned to the plurality of direct user groups,
   wherein the largest memory usage limit is set as the memory usage limit for the user.

5. The computer-implemented method of claim 1, wherein determining a memory usage limit for the data processing job further comprises:
   upon determining that at least one direct user group that is assigned a memory usage limit does not exist among the plurality of user groups, determining whether at least one indirect user group that is assigned a memory usage limit exists among the plurality of user groups; and
   upon determining that at least one indirect user group that is assigned a memory usage limit exists among the plurality of user groups, setting the memory usage limit assigned to the at least one indirect user group as the memory usage limit for the user.

6. A computer-implemented method of governing memory allocation, the method comprising:
   (a) receiving a job request from a user, the job request specifying a data processing job to be completed and the data processing job comprising a plurality of tasks;
   (b) retrieving memory settings for a plurality of user groups associated with the user;
   (c) determining a plurality of memory usage limits assigned to a plurality of direct user groups among the plurality of user groups, each direct user group being directly associated with the user;
   (d) determining a plurality of memory usage limits assigned to a plurality of indirect user groups among the plurality of user groups, each indirect user group being associated with one or more direct user groups and not directly associated with the user;
   (e) determining a memory usage limit for the data processing job as: a largest memory usage limit assigned to a direct user group among the plurality of user groups upon determining that at least one direct user group among the plurality of direct user groups is assigned a memory usage limit, or
   the largest memory usage limit assigned to an indirect user group among the plurality of indirect user groups upon determining that no direct user group among the plurality of direct user groups is assigned a memory usage limit, or
   a default memory usage limit upon determining that no user group among the plurality of user groups is assigned a memory usage limit;
   (f) automatically monitoring a plurality of executions of the data processing job; (g) calculating a quantity of memory needed for each of the plurality of executions of the data processing job by automatically analyzing computer readable code generated for the job;
   (h) determining an aggregate quantity of memory needed for a task to be executed based on the monitoring;
   (i) updating the aggregate quantity of memory needed for the data processing job based on the quantity of memory needed for the task;
   (j) determining whether the aggregate quantity of memory exceeds the memory usage limit; and
   (k) upon determining that the aggregate quantity of memory exceeds the memory usage limit, providing instructions to cancel the data processing job; or
   (l) upon determining that the aggregate quantity of memory does not exceed the memory usage limit:
   providing instructions to complete the task; and
   if one or more tasks remain to be completed among the plurality of tasks, performing steps (f) through (k) or (l) for a task determined from the one or more remaining tasks.

7. A system comprising:
one or more processors; and
one or more non-transitory computer readable media comprising instructions which, when executed by the one or more processors, cause the one or more processors to perform operations for governing memory allocation, the operations comprising:
   receiving a job request from a user, the job request specifying a data processing job to be completed;
   retrieving memory settings for a plurality of user groups associated with the user;
   determining a plurality of memory usage limits assigned to a plurality of direct user groups among the plurality of user groups, each direct user group being directly associated with the user;
   determining a plurality of memory usage limits assigned to a plurality of indirect user groups among the plurality of user groups, each indirect user group being associated with one or more direct user groups and not directly associated with the user;
   determining a memory usage limit for the data processing job as:
      a largest memory usage limit assigned to a direct user group among the plurality of user groups upon determining that at least one direct user group among the plurality of direct user groups is assigned a memory usage limit, or
      the largest memory usage limit assigned to an indirect user group among the plurality of indirect user groups upon determining that no direct user group among the plurality of direct user groups is assigned a memory usage limit, or
      a default memory usage limit upon determining that no user group among the plurality of user groups is assigned a memory usage limit;
   automatically monitoring a plurality of executions of the data processing job;
   calculating a quantity of memory needed for each of the plurality of executions of the data processing job by automatically analyzing computer readable code generated for the job;
   determining an aggregate quantity of memory needed for the data processing job based on the monitoring;
   determining whether the quantity of memory needed for the data processing job exceeds the memory usage limit; and
   upon determining that the quantity of memory needed for the data processing job exceeds the memory usage limit, providing instructions to cancel the data processing job; or upon determining that the quantity of memory needed for the data processing job does not exceed the memory usage limit, allowing execution of the data processing job.

8. The system of claim 7, wherein the memory usage limit for the data processing job is determined based on a memory usage limit assigned to a user group associated with the user.

9. The system of claim 7, wherein the memory usage limit is pre-configured by an administrator.

10. The system of claim 7, wherein determining that at least one direct user group that is assigned a memory usage limit exists among the plurality of user groups comprises:
    determining a plurality of direct user groups that are assigned a plurality of memory usage limits respectively; and
    determining a largest memory usage limit among the plurality of memory usage limits assigned to the plurality of direct user groups,
    wherein the largest memory usage limit is set as the memory usage limit for the user.

11. The system of claim 7, wherein determining a memory usage limit for the data processing job further comprises:
    upon determining that at least one direct user group that is assigned a memory usage limit does not exist among the plurality of user groups, determining whether at least one indirect user group that is assigned a memory usage limit exists among the plurality of user groups; and
    upon determining that at least one indirect user group that is assigned a memory usage limit exists among the plurality of user groups, setting the memory usage limit assigned to the at least one indirect user group as the memory usage limit for the user.

12. One or more non-transitory computer readable media comprising instructions which, when executed by one or more processors, cause the one or more processors to perform operations for governing memory allocations, the operations comprising:
    receiving a job request from a user, the job request specifying a data processing job to be completed;
    retrieving memory settings for a plurality of user groups associated with the user;
    determining a plurality of memory usage limits assigned to a plurality of direct user groups among the plurality of user groups, each direct user group being directly associated with the user;
    determining a plurality of memory usage limits assigned to a plurality of indirect user groups among the plurality of user groups, each indirect user group being associated with one or more direct user groups and not directly associated with the user;
    determining a memory usage limit for the data processing job as:
        a largest memory usage limit assigned to a direct user group among the plurality of user groups upon determining that at least one direct user group among the plurality of direct user groups is assigned a memory usage limit, or
        the largest memory usage limit assigned to an indirect user group among the plurality of indirect user groups upon determining that no direct user group among the plurality of direct user groups is assigned a memory usage limit, or
        a default memory usage limit upon determining that no user group among the plurality of user groups is assigned a memory usage limit;
    automatically monitoring a plurality of executions of the data processing job;
    calculating a quantity of memory needed for each of the plurality of executions of the data processing job by automatically analyzing computer readable code generated for the job;
    determining an aggregate quantity of memory needed for the data processing job based on the monitoring;
    determining whether the quantity of memory needed for the data processing job exceeds the memory usage limit; and
    upon determining that the quantity of memory needed for the data processing job exceeds the memory usage limit, providing instructions to cancel the data processing job; or
    upon determining that the quantity of memory needed for the data processing job does not exceed the memory usage limit, allowing execution of the data processing job.

* * * * *